United States Patent
Kruckenberg et al.

(10) Patent No.: US 11,072,413 B2
(45) Date of Patent: Jul. 27, 2021

(54) VIRTUAL AERODYNAMIC SURFACE SYSTEMS

(71) Applicant: ROHR, INC., Chula Vista, CA (US)

(72) Inventors: Teresa M. Kruckenberg, La Mesa, CA (US); Vijay V. Pujar, San Diego, CA (US); Robert L. Braden, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 15/977,174

(22) Filed: May 11, 2018

(65) Prior Publication Data

US 2018/0257756 A1 Sep. 13, 2018

Related U.S. Application Data

(62) Division of application No. 14/083,077, filed on Nov. 18, 2013, now Pat. No. 9,994,301.

(51) Int. Cl.
*B64C 1/38* (2006.01)
*B64C 21/00* (2006.01)
*B64C 23/00* (2006.01)

(52) U.S. Cl.
CPC .............. *B64C 1/38* (2013.01); *B64C 21/00* (2013.01); *B64C 23/005* (2013.01); *B64C 2220/00* (2013.01); *B64C 2230/02* (2013.01); *Y02T 50/10* (2013.01)

(58) Field of Classification Search
CPC .. B64C 1/38; B64C 1/40; B64C 21/00; B64C 21/02; B64C 21/10; B64C 23/005
See application file for complete search history.

(56) References Cited

U.S. PATENT DOCUMENTS

| | | | | |
|---|---|---|---|---|
| 4,516,747 A * | 5/1985 | Lurz | ....................... | B64C 23/00 244/130 |
| 4,693,201 A * | 9/1987 | Williams | ............... | B62D 35/00 114/290 |
| 4,802,642 A * | 2/1989 | Mangiarotty | ........... | B64C 23/00 244/130 |

(Continued)

FOREIGN PATENT DOCUMENTS

| | | | | |
|---|---|---|---|---|
| DE | 102011101142 A1 * | 11/2012 | ............. | B64D 15/12 |
| WO | 2013066690 | 5/2013 | | |

OTHER PUBLICATIONS

Extended European Search Report dated Mar. 27, 2015 in European Application No. 14193594.0.

(Continued)

*Primary Examiner* — Assres H Woldemaryam
*Assistant Examiner* — Aaron M Rodziwicz
(74) *Attorney, Agent, or Firm* — Snell & Wilmer L.L.P.

(57) ABSTRACT

A method of generating a pressure wave proximate an airflow surface and altering airflow to promote a localized lowering of skin friction over the airflow surface is described herein. A series of pressure waves may be configured to create a virtual riblet to control turbulent vortices in a boundary layer adjacent to the airflow surface creating a virtual riblet. The pressure waves may be configured to prevent disruption of the flow of air relative to at least one of a step or a gap associated with the airflow surface. The pressure wave generating system may be comprised of at least one of a thermoacoustic material, a piezoelectric material and a semiconductor material, and a microelectric circuit.

4 Claims, 6 Drawing Sheets

(56) References Cited

U.S. PATENT DOCUMENTS

| | | | | |
|---|---|---|---|---|
| 5,263,793 | A | * | 11/1993 | Sirovich ............... B64C 21/10 138/39 |
| 5,365,490 | A | * | 11/1994 | Katz ..................... B64C 23/00 244/204 |
| 5,803,410 | A | * | 9/1998 | Hwang ............... B64C 21/025 114/67 A |
| 5,941,481 | A | * | 8/1999 | Snarski ................... B63B 1/32 244/130 |
| 6,427,948 | B1 | * | 8/2002 | Campbell ............ B64C 23/06 244/130 |
| 2005/0061908 | A1 | * | 3/2005 | Kremeyer ........... B64C 23/005 244/1 N |
| 2006/0060720 | A1 | * | 3/2006 | Bogue .................. B64C 23/04 244/200 |
| 2010/0166232 | A1 | * | 7/2010 | Liu ..................... H04R 1/028 381/164 |

OTHER PUBLICATIONS

USPTO; Restriction Requirement Office Action dated Jul. 16, 2015 in U.S. Appl. No. 14/083,077.

USPTO; Pre-Interview First Office Action dated Feb. 25, 2016 in U.S. Appl. No. 14/083,077.

USPTO; Final Office Action dated Aug. 3, 2016 in U.S. Appl. No. 14/083,077.

USPTO; Advisory Action dated Nov. 17, 2016 in U.S. Appl. No. 14/083,077.

USPTO; Final Office Action dated Jul. 10, 2017 in U.S. Appl. No. 14/083,077.

USPTO; Non-Final Office Action dated Nov. 30, 2017 in U.S. Appl. No. 14/083,077.

USPTO; Notice of Allowance dated Apr. 3, 2018 in U.S. Appl. No. 14/083,077.

* cited by examiner

VIRTUAL AERODYNAMIC SURFACE SYSTEMS

CROSS-REFERENCE TO RELATED APPLICATIONS

This application is a divisional of, and claims priority to, and the benefit of U.S. Non-provisional application Ser. No. 14/083,077, entitled "VIRTUAL AERODYNAMIC SURFACE SYSTEMS," filed on Nov. 18, 2013. The '077 application is hereby incorporated by reference in its entirety.

FIELD

The present disclosure relates to the fields of materials and aerodynamics, and more specifically to the use of materials to reduce a skin friction drag force in an aerodynamic machine such as an aircraft.

BACKGROUND

It has been proposed by others to provide riblets on the surface of an aircraft or other aerodynamic structure or machine in order to reduce the drag force of an airflow across the surface. The proposed riblets are very small, constructed typically in the micron range. Due to their size, they require specialized and difficult manufacturing techniques. Some companies have proposed manufacturing films with a riblet surface which could be applied to the surfaces of an aircraft or wind turbine blade, for instance, to reduce drag. Perhaps due in part to the structural durability and the difficulty and expense of manufacturing the riblets either on an aerodynamic surface or on a film to be applied to an aerodynamic surface, riblets have not achieved any sustained commercial applications to date.

SUMMARY

According to various embodiments, a system and method of using pressure waves to interact with airflow surfaces is described herein. According to various embodiments, virtual aerodynamic surface systems with significantly reduced drag are disclosed herein. The system may comprise a fluid flow surface, such as an air flow surface. A pressure wave generating structure may be coupled to and/or proximate the air flow surface. The pressure wave generating structure may be configured to generate pressure waves, such as sound pressure waves, at the surface. The sound pressure waves may be configured to create virtual riblets to reduce skin friction drag over the fluid flow surface.

In another embodiment, the sound pressure waves may be configured to act as a virtual cover over a perforation. Stated another way, the sound pressure waves may be configured to reduce air flow drag over a perforation.

In another embodiment, the sound pressure waves may be configured to effectively present a virtually smooth aerodynamic surface and/or reduce drag over a step or a gap between adjacent airflow surfaces.

In another embodiment, a method of generating a pressure wave from within a core of composite material through a perforated structure is described herein. The pressure wave may be configured to prevent disruption of a fluid flow of air over the perforated structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure proposes, among other ideas, to construct virtual riblets using pressure waves, such as thermoacoustic pressure waves, generated on and/or near an aerodynamic surface to reduce drag friction. The riblets are virtual in the sense that they do not comprise an actual physical peak and valley structure to form the traditionally proposed pattern of ribs, rather the peaks and valleys are created with pressure waves on an aerodynamic surface to create channels for the air flow in the same or similar manner as the physical riblets.

Figure 1:
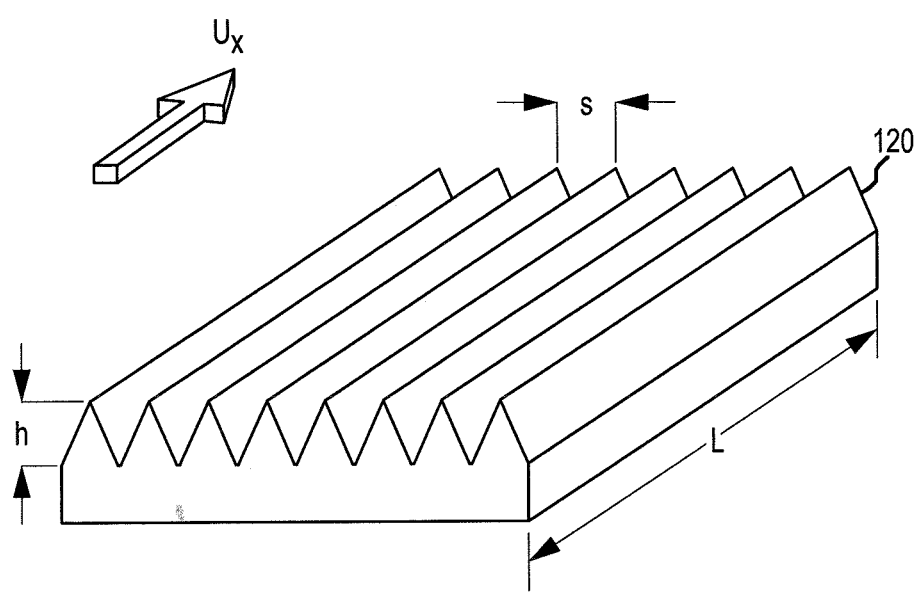
FIG. 1 depicts a physical riblet structure.

With reference to FIG. 1, physical riblets 120 have been historically proposed to reduce the drag force of an air flow across an aerodynamic surface. For instance, a series of physical, generally periodic riblets 120 may be arranged to extend from a surface with a particular size and profile predicted to reduce skin friction drag. Without being limited to any particular proposed theory for how the riblets function, these physical riblets 120 are believed to control the turbulent vortices in a boundary layer adjacent to the surface having the physical riblet 120. The physical riblets 120 may extend longitudinally along the surface and have a triangular or other cross-section in the transverse direction. Ux may depict the direction of fluid flow across the surface of the physical riblets 120. The apex of the cross-section defines a continuous, undulating ridge with peaks and valleys. Though they may be any size, the height of the riblets "h" may vary from about 0.02 mm to 0.152 mm (about 0.0007874 inches to 0.005984 inches). The width "s" between peaks may be any length but, in general, is uniform across a series of physical riblets. Physical riblet 120 may be any desired length "L."

In addition to being difficult to manufacture, the physical riblets 120 may be contaminated and/or eroded over time. For instance, the surfaces of physical riblets 120 may accumulate dirt which may reduce the effectiveness of the physical riblet 120 configuration. Also, the physical riblets are fixed once formed and cannot be changed. Additionally, over time, the surfaces of physical riblets 120 may degrade and/or wear down. This surface degradation also limits physical riblet 120 effectiveness.

Figure 2A:
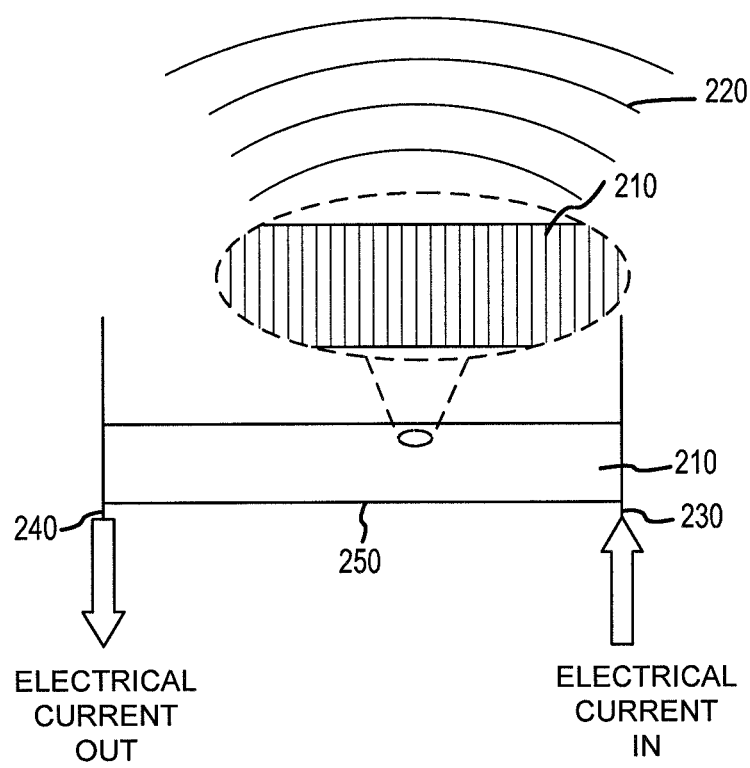
FIG. 2A illustrates an aligned carbon nanotube system for producing thermoacoustic sound waves in accordance with various embodiments.

According to various embodiments and with reference to FIG. 2A, it is proposed to create a virtual riblet using a pattern to generate pressure waves over an aerodynamic surface. For instance, the interaction of these pressure waves, with the structure of the turbulent boundary layer of the fluid (air flow) may reduce the skin friction drag coefficient (Cdf) of surface as compared to an identical smooth surface without virtual riblets, in the same or similar manner as physical riblets would.

Figure 2B:
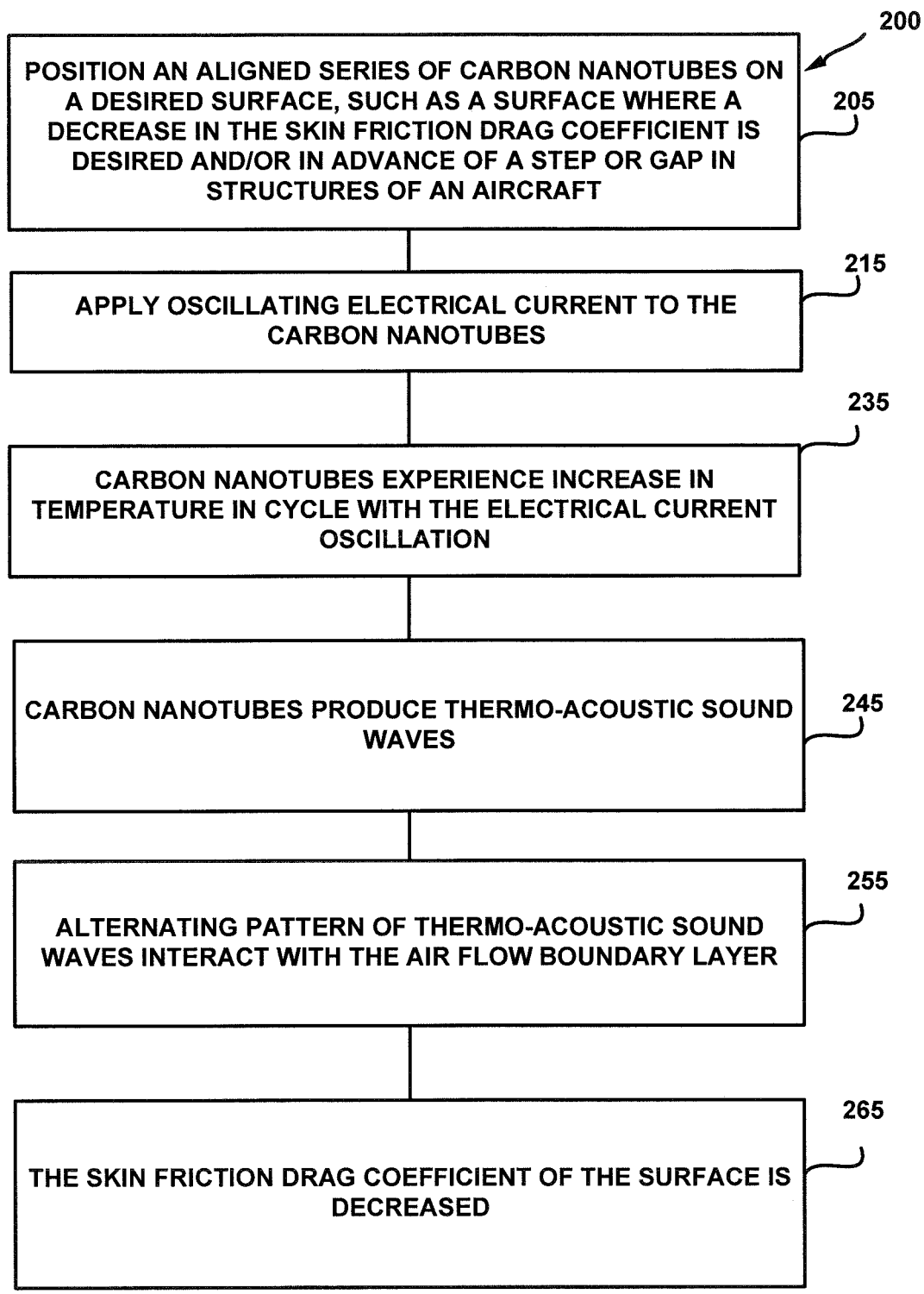
FIG. 2B depicts a process flow for a series of virtual riblets in accordance with various embodiments.

These pressure waves may be produced using a thermoacoustic mechanism with nanostructured or microstructured materials. For instance, a nanomaterial, such as nanostructured substrate (e.g., buckypaper) 210 may be used to produce thermoacoustic waves. The nanostructured substrate may comprise nanotubes and/or nanofibers and/or carbon nanoplatelets or other conductive nanomaterials or can be combination of more than one type of conductive nanomaterial. The nanostructured substrate 210 may comprise aggregated carbon nanomaterials to form a thin sheet and may be embedded in a polymer resin (e.g., epoxy). The carbon nanotubes may be about 1000 to 100,000 times thinner than a human hair (typically understood to be approximately 100 microns). Stated another way, carbon nanotubes typically run from about 1 nm to 100 nm in diameter. Carbon nanofibers may be about 100 to 10,000 times thinner in diameter than a human hair. Stated another way, the diameter of carbon nanofibers typically run from 10 nm to 500 nm, and preferably about 100 nm. Carbon nanoplatelets, sometimes commonly called graphene nanoplatelets, are very thin platelets of graphitic carbon. The platelets may be about 1 nm to 100 nm in thickness, more typically 2 nm to 20 nm in thickness. The platelets may be 100 nm to 50,000 nm in diameter, more typically 500 nm to 5000 nm. The diameter of the platelets may vary in different directions. For instance a nanoplatelet may be 500 nm in one direction and 3000 nm in another direction and have a thickness of 3 nm. These carbon nanotubes or nanofibers or nanoplatelets, referred to collectively as nanomaterials, may be arranged in different orientations. The carbon nanomaterials 210 may be arranged in any suitable orientation. According to various embodiments, carbon nanomaterials 210 may be arranged in random orientations, but generally form a generally flat sheet of nonwoven material, commonly referred to as a veil or paper. According to various embodiments the carbon nanotubes or nanofibers may be grown on a base substrate and their orientation may be aligned in substantially the same direction during fabrication of the nanostructured substrate. The base substrate may be a veil or paper or a woven fabric or mesh. The base substrate may be comprised of a suitable material, including but not limiting to, carbon, non-oxide ceramic (e.g., silicon carbide), a piezoelectric ceramic (e.g., strontium titanate), metal (e.g., aluminum or copper alloys). The carbon nanotubes 210 may also be oriented substantially parallel to each other and normal to a substrate surface, such as surface 250 (as generally depicted in FIG. 2). At least one end of the these carbon nanotubes may be fixed to the surface 250 (Step 205). The above described oriented carbon nanotubes grown on a substrate, 210, or the flat sheet of veil or paper may be all referred to as a nanostructured substrate.

An oscillating electrical current may be applied across the surface 250 having the attached, nanostructured substrate (Step 215). For instance, an electrical current may be applied to a current input 230 and applied across the surface with current exiting the structure at current output 240. In response to an electrical current being applied, and the relative conductivity of the substrate surface materials due to the conductive nanomaterial, electrical current should flow at least in part through the nanomaterials. The nanomaterial of the nanostructured substrate structure may experience an increase in heat as a result of resistive heating due to the electrical current. The heat in the nanotubes will quickly transfer to the surrounding air. Due probably in part to the inherently large surface area to mass ratio of the nanotubes, the heat transfer to the surrounding air will occur very rapidly. If the current is oscillated between zero (no current) and a nominal current value with an electronic current driving mechanism, then the nanotubes will rapidly heat and cool in cycle with the electrical current oscillation. The air will likewise heat and cool in cycle with the current oscillation as a result of the very rapid heat transfer. The heating and cooling of the air will cause it to expand and contract, thus creating a pressure waves in cycle with the oscillation of the electrical current (Step 235, 245). The oscillation and magnitude of the electrical current can be varied to control the wavelength and amplitude of the pressure waves to provide the maximum benefit for drag reduction for a given velocity of air over the flow surface. In one embodiment of this invention, the wavelength and amplitude of the pressure waves can be controlled to create stationary waves to produce a virtual riblet structure consisting of peaks and valleys of air densities over the air flow surface.

In another embodiment, the density of nanomaterials within the nanostructured substrate structure may be varied to produce a desired sound pressure wave 220. Areas of low density, or gaps within the structure, may be created adjacent to an area of high density of the said nanomaterials, with a periodicity that is analogous to the peaks and valleys in a physical riblet 110 without a physical riblet structure to increase the effectiveness of the pressure waves to create a virtual riblet surface. For instance, these areas of periodic low and high densities may be used to further augment the performance of the virtual riblet to provide optimal drag reduction for any given pressure and velocity of air over the aerodynamic surface. The variation in volumetric or number density of nanomaterials may be used in combination with the oscillation and magnitude of electrical current to achieve optimal virtual riblet for drag reduction. These pressure wave patterns 220 (aka virtual riblets) may be configured to control the turbulent vortices in a boundary layer adjacent to the aerodynamic surface having the pressure waves 220 (Step 255). The pressure waves 220 created via/by the pressure wave generating structure, such as a nanostructured substrate, may reduce skin friction drag of/over the fluid flow surface 250 (Step 265).

Though the pressure wave has been described above as being created via a thermoacoustic process, a pressure wave may be created to interact with an aerodynamic surface or airflow structure via any suitable method. For instance, the pressure wave generating structure may be formed using a semiconductor or a piezoelectric material and/or formed from a microelectric circuit disposed proximate to an airflow surface to create a pressure wave to interact with the flow of air and the airflow surface. The piezoelectric material, semiconductor, and/or microelectric circuit may be etched over an airflow surface and/or embedded proximate the airflow surface. For instance, a matrix and/or pattern of piezoelectric transducers may be configured to convert electrical energy into sound waves. These waves may be configured to affect a flow of air, such as to control turbulent vortices in a boundary layer adjacent to the airflow surface. Alternatively, the semiconductor or microelectric circuit may be designed to create thermoacoustic waves similar to that described in the nanostructured substrate.

Figure 3:
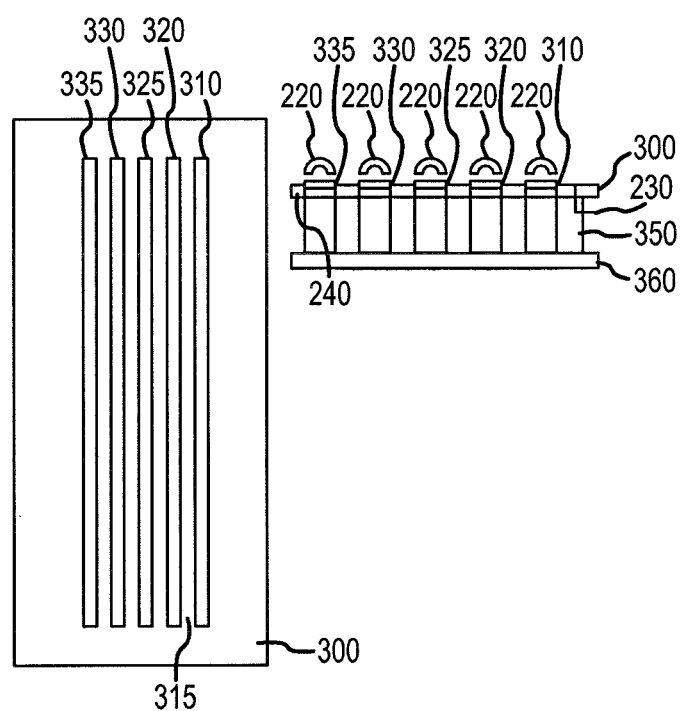
FIG. 3 illustrates strips of nanostructured substrate applied to a surface in accordance with various embodiments.

According to various embodiments and with reference to FIG. 3, a surface 300 where reduced skin friction drag is desired may be applied with ribbons/strips of the nanostructured substrate 310, 320, 325, 330, 335 comprising a nanostructured substrate structure (as depicted in FIG. 2A). For instance, paper 310, 320, 325, 330, 335 may be applied to airflow surface of an inner fixed structure "IFS" of a nacelle thrust reverser system or to the exterior surface of any of the aircraft turbofan propulsion system nacelle components such as the inlet, the fan cowl, the inlet inner barrel, or the inlet outer barrel. Visually, to the naked eye and/or tactilely, by hand touch, the surface 300 to which the nanostructured substrate layer 310, 320, 325, 330, 335 comprising the conductive nanomaterials 210 structure is applied may appear smooth. Surface 300 may be the top surface of a composite material. Core 350 may be secured to a surface such as a backskin 360. Though the pressure wave generating substrate 310, 320, 325, 330, 335 may be applied on any desired surface in any desired geometric shape, such as ribbons, strips or other structures such as to enhance its performance as a virtual riblet. Thin rectangular strips of paper 310, 320, 325, 330, 335 are depicted herein. According to various embodiments the pressure wave generating structure 310, 320, 325, 330, 335 may be grown directly on the surface 300. Alternatively, other deposition methods may be used to apply the pressure wave generating structure 310, 320, 325, 330, 335 to the surface 300. For instance, nanomaterials 310, 320, 325, 330, 335 may be applied with an epoxy or thermoplastic binder to the surface 300 as an "ink" coating. Unlike physical riblets, paper 310, 320, 325, 330, 335 may be applied with relative ease over surfaces having contour. A gap 315 between strips of paper 310, 320, 325, 330, 335 may help approximate the distance between peaks "s" as depicted in FIG. 1. Alternatively a nanostructured substrate with periodically varying densities of nanomaterials may be applied. Gap 315 may be any desired distance. As depicted in FIG. 3 the pressure waves 220, such as thermoacoustic pressure waves, and their relative locations will themselves approximate the peaks and valleys of conventional physical riblets (as depicted in FIG. 1).

Figure 4:
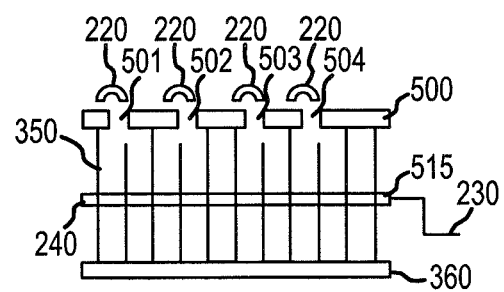
FIG. 4 illustrates strips of nanostructured substrate located near a surface within a core in accordance with various embodiments.
Figure 5:
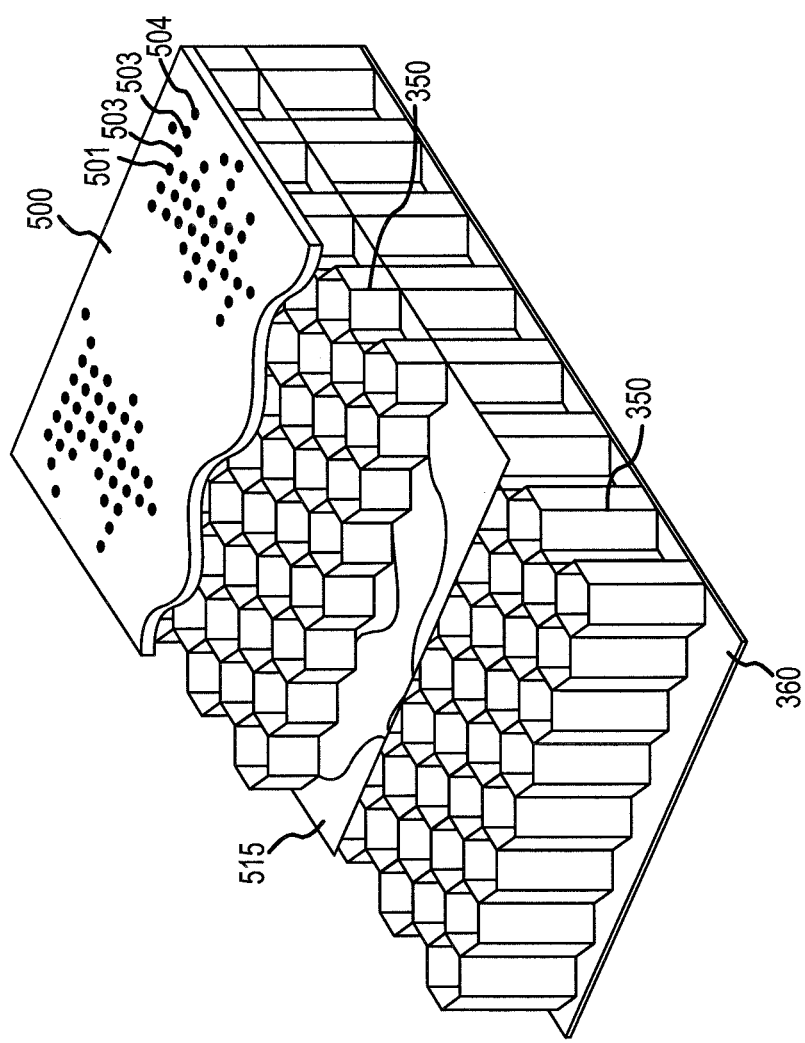
FIG. 5 illustrates a double degree of freedom composite core structure in accordance with various embodiments.

With reference to FIGS. 4 and 5, airflow surfaces, such as surface 500, of elements of an aircraft, such as on and/or within the propulsion system nacelle are conventionally perforated with thousands to millions of perforations 501, 502, 503, 504 typically in the range of about 0.1 mm (0.004 inch) to 2.5 mm (0.1 in) in diameter. Conventionally, the perforations 501, 502, 503, 504 are configured to attenuate the jet engine's noise by directing the sound into the honeycomb core 350, and then reflecting a sound wave out of the honeycomb core 350 which is out of phase with the original sound wave to destructively interfere with, and cancel one another in a known manner. As is further known the honeycomb core 350 may comprise an inner septum 515 or porous layer, effectively doubling the number of cells, and providing cells of varying heights for greater noise suppression and treatment of a wider range of attenuated frequencies.

In further embodiments, and with reference to FIGS. 4 and 5, the septum layer 515 may be coated with and/or replaced with sheet/section of nanostructured substrate layer comprising a nanomaterial 210 structure. Pressure waves 220 may propagate from within the core of channels and exit perforations 501, 502, 503, 504 in surface 500. As before, in the previously described surface located embodiments, these pressure waves 220, which may be thermoacoustic pressure waves, may effectively create a virtually smooth surface for the air flow and may reduce skin friction drag along surface 500. This septum layer embodiment may be used in conjunction with the surface located virtual riblet embodiment to provide an additive benefit. As in the surface located embodiment, the oscillation and magnitude of the electrical current can be varied in the septum layer to control the pressure waves to produce a virtually smooth surface to cancel the negative effects of the perforations on drag reduction.

According to various embodiments, the pressure wave generating structure may be located adjacent to a step and/or gap between components. For instance, where two structures of an aircraft are joined or are placed adjacent to one another, there may be a slight gap between the parts or an overlap of parts (step down or step up). The pressure wave generating structure may be located proximate to the air flow surface just prior to the step or gap. Alternatively, the pressure wave generating structure may be located on a surface directly under the step and/or gap. The pressure wave generating structure may produce pressure waves in the manner described in the previous embodiments to produce a virtual gap filler with respect to the step or gap such that smooth fluid flow is achieved over the step or gap. In this way, the pressure waves may create a virtual fairing surface to control airflow. As in the previous embodiments, the oscillation and magnitude of the electrical current can be varied in the pressure wave generating structure to control the amplitude and wavelength of pressure wave to produce an optimal gap filler. For instance, the step or gap between the said structures of the aircraft can vary with temperature or pressure or with age. By altering the oscillation and magnitude of the current, an optimal gap filler may be formed that presents a virtually smooth aerodynamic surface with reduced drag from the step or gap. This gap filler embodiment may be combined with the previously described virtual riblet embodiment.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

We claim:

1. A method comprising:
    generating a pressure wave from within a core of a composite material through a perforated structure, the perforated structure defining a gap, wherein:
    the pressure wave is configured to prevent disruption of a fluid flow of air over the perforated structure,
    the core of the composite material comprising a noise attenuation structure comprising a septum coated with a plurality of nanomaterials,
    the pressure wave is generated by applying an oscillating electrical current to the plurality of nanomaterials to propagate pressure waves from within the core through the perforated structure,
    the pressure wave creates a gap filler that presents a virtually smooth aerodynamic surface with reduced drag,
    the pressure wave forms a valley of a virtual riblet surface in a low density area, and
    the pressure wave forms a peak of the virtual riblet surface in a high density area.

2. The method of claim 1, wherein the composite material further comprises an acoustically treated sandwich composite structure.

3. The method of claim 1, wherein a pressure wave generating material is comprised of at least one of a thermoacoustic material, a piezoelectric material and a semiconductor material, and a microelectric circuit, and further comprising applying an electrical current to the pressure wave generating material such that current flows through the pressure wave generating material.

4. The method of claim 1, wherein the pressure wave is configured to create reduction in drag as compared with the fluid flow of air over the perforated structure without the pressure wave.

* * * * *